(12) United States Patent
Maikuma et al.

(10) Patent No.: US 7,464,049 B2
(45) Date of Patent: Dec. 9, 2008

(54) PRODUCT ORDERING DEVICE

(75) Inventors: Masaaki Maikuma, Tokyo (JP); Hiroaki Watanabe, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 537 days.

(21) Appl. No.: 10/511,432

(22) PCT Filed: May 23, 2003

(86) PCT No.: PCT/JP03/06447

§ 371 (c)(1),
(2), (4) Date: Oct. 22, 2004

(87) PCT Pub. No.: WO03/100681

PCT Pub. Date: Dec. 4, 2003

(65) Prior Publication Data

US 2005/0182635 A1 Aug. 18, 2005

(30) Foreign Application Priority Data

May 23, 2002 (JP) .............................. 2002-149876

(51) Int. Cl.
*G06Q 30/00* (2006.01)
(52) U.S. Cl. ....................................................... 705/26
(58) Field of Classification Search ................... 705/26, 705/27

See application file for complete search history.

(56) References Cited

U.S. PATENT DOCUMENTS

2002/0143665 A1 * 10/2002 Santos et al. ................... 705/28
2003/0110104 A1 * 6/2003 King et al. ..................... 705/28

OTHER PUBLICATIONS

No Author, "Automating distribution", Office Magazine, p. 43, Sep. 1990. Retrieved from Dialog File: 2, Acc#: 04745742.*

* cited by examiner

*Primary Examiner*—Naeem Haq
(74) *Attorney, Agent, or Firm*—Arent Fox LLP (57) ABSTRACT

There is provided a product ordering system for supplying products from a production source to a plurality of dealers, according to an order in which the orders are placed. The product ordering system includes estimated sales quantity-setting means 7 for setting an estimated sales quantity of the products to be sold during a predetermined time period, for each of the dealers, upper limit value-setting means 12 for setting an upper limit value LN, for each of the dealers, according to the set estimated sales quantity and a predetermined coefficient P, ordering means 16 for placing orders for products from the dealers with the production source, cumulative order quantity-calculating means 15 for calculating a cumulative order quantity CN during the predetermined time period, for each of the dealers, and order quantity-limiting means 15 for limiting orders for products in excess of the limit value LN by the dealer, by comparing the calculated cumulative order quantity CN and the upper limit value LN with each other.

8 Claims, 11 Drawing Sheets

| MODEL | DOOR CLASS | LIMITATION NUMBER | FROM DATE | TO DATE |
|---|---|---|---|---|
| a | 2WD | 001 | 2002/4/11 | 2002/6/5 |
| | 4WD | 002 | 2002/5/9 | 2002/9/4 |
| | FOR PHYSICALLY HANDICAPPED PERSON | — | — | — |
| b | 2WD | 003 | 2002/5/9 | 2002/12/25 |
| | 4WD | | | |

F I G. 4

| YEAR/MONTH/WEEK | | SCHEDULED TIME PERIOD | | RATIO P(%) | | | | REMARKS |
|---|---|---|---|---|---|---|---|---|
| FROM DATE | TO DATE | FROM MONTH | TO MONTH | AFFILIATED GROUP 1 | AFFILIATED GROUP 2 | AFFILIATED GROUP 3 | CORPORATE BUSINESS DEPARTMENT | |
| 2002/5/9 | 2002/5/15 | 2002/5 | 2002/5 | 10 | 20 | 15 | 120 | SINGLE-MONTH PLAN |
| 2002/5/9 | 2002/5/15 | 2002/5 | 2002/6 | 15 | 15 | 15 | 20 | MULTI-MONTH PLAN |
| 2002/5/9 | 2002/5/15 | 2002/5 | 2002/5 | 1 | 20 | 150 | 9999 | |

| YEAR/MONTH/WEEK | | SCHEDULED TIME PERIOD | | RATIO P (%) | | | |
|---|---|---|---|---|---|---|---|
| FROM DATE | TO DATE | FROM MONTH | TO MONTH | AFFILIATED GROUP 1 | AFFILIATED GROUP 2 | AFFILIATED GROUP 3 | CORPORATE BUSINESS DEPARTMENT |
| 2002/5/9 | 2002/5/15 | 2002/5 | 2002/5 | 10 | 20 | 15 | 120 |

| DAILY | SCHEDULED TIME PERIOD | | RATIO P (%) | | | |
|---|---|---|---|---|---|---|
| TARGET DATE | FROM MONTH | TO MONTH | AFFILIATED GROUP 1 | AFFILIATED GROUP 2 | AFFILIATED GROUP 3 | CORPORATE BUSINESS DEPARTMENT |
| 2002/5/09 (THU) | 2002/5 | 2002/5 | 10 | 10 | 10 | 10 |
| 2002/5/10 (FRI) | — | — | — | — | — | — |
| 2002/5/11 (SAT) | 2002/5 | 2002/5 | 10 | 10 | 10 | 10 |
| 2002/5/12 (SUN) | — | — | — | — | — | — |
| 2002/5/13 (MON) | — | — | — | — | — | — |
| 2002/5/14 (TUE) | — | — | — | — | — | — |
| 2002/5/15 (WED) | — | — | — | — | — | — |

| | 2002/5/09 (THU) | 2002/5/10 (FRI) | 2002/5/11 (SAT) | 2002/5/12 (SUN) | 2002/5/13 (MON) | 2002/5/14 (TUE) | 2002/5/15 (WED) |
|---|---|---|---|---|---|---|---|
| WEEKLY | ○ | | | | | | |
| DAILY | | ○ | ○ | ○ | ○ | ○ | ○ |

FIG. 8A

| SALES COMPANY | SCHEDULED TIME PERIOD | RATIO P | ESTIMATED TO-BE-SOLD VEHICLE NUMBER (JUNE) | CALCULATED VALUE | LIMITATION VEHICLE NUMBER LN |
|---|---|---|---|---|---|
| A | JUNE | 50% | 30 | 15 | 15 |
| B | JUNE | 50% | 11 | 5.5 | 6 |
| C | JUNE | 50% | 1 | 0.5 | 1 |

FIG. 8B

| SALES COMPANY | SCHEDULED TIME PERIOD | RATIO P | ESTIMATED TO-BE-SOLD VEHICLE NUMBER (JUNE TO AUGUST) | | | | CALCULATED VALUE | LIMITATION VEHICLE NUMBER LN |
|---|---|---|---|---|---|---|---|---|
| | | | TOTAL | JUNE | JULY | AUGUST | | |
| A | JUNE TO AUGUST | 20% | 68 | 30 | 18 | 20 | 13.6 | 14 |
| B | JUNE TO AUGUST | 20% | 24 | 11 | 6 | 7 | 4.8 | 5 |
| C | JUNE TO AUGUST | 20% | 2 | 1 | 0 | 1 | 0.4 | 1 |

FIG. 9

| SALES COMPANY | AUTOMATICALLY-ALLOCATED VEHICLE NUMBER | ADJUSTED NUMBER |
|---|---|---|
| A | 5 | 10 |
| B | 15 | 30 |
| C | 3 | 5 |
| REGIONAL TOTAL SUM | 23 | 45 |

FIG. 10

| SALES COMPANY | AUTOMATICALLY-ALLOCATED VEHICLE NUMBER | ADJUSTED NUMBER |
|---|---|---|
| A | 5 | 6 |
| B | 15 | 13 |
| C | 3 | 4 |
| REGIONAL TOTAL SUM | 23 | 23 |

F I G. 1 1

F I G. 1 2

| SALES COMPANY | LIMITATION VEHICLE NUMBER LN | TOTAL NUMBER OF ORDERED VEHICLES | | ORDER COUNT CN | CANCELLED VEHICLE NUMBER | | NUMBER OF ORDERABLE VEHICLES |
|---|---|---|---|---|---|---|---|
| A | 100 | 80 | COMMISSIONED 20 | 60 | COMMISSIONED 10 | 40 |
| | | | NON-COMMISSIONED 60 | | NON-COMMISSIONED 0 | |
| B | 80 | 50 | COMMISSIONED 30 | 20 | COMMISSIONED 0 | 70 |
| | | | NON-COMMISSIONED 20 | | NON-COMMISSIONED 10 | |
| C | 50 | 50 | COMMISSIONED 0 | 50 | COMMISSIONED 0 | 0 |
| | | | NON-COMMISSIONED 50 | | NON-COMMISSIONED 0 | |

FIG. 13

PRODUCT ORDERING DEVICE

TECHNICAL FIELD

This invention relates to a product ordering system for supplying products from a production source to a plurality of dealers in response to orders requesting supply of the products, which are placed by the plurality of dealers.

BACKGROUND ART

In a conventional product ordering system of the aforementioned kind, products are generally supplied from a production source to dealers according to the order in which the orders are place by the dealers. This product ordering system is advantageous in that it is possible to maintain fairness between dealers since products are supplied according to the order in which the orders are placed by the dealers and at the same time enhance dealers' willingness to sell the products since the earlier the dealers place orders, the earlier they can obtain products for sale, which leads to enhanced sales performance.

However, in the above conventional product ordering system, products are simply supplied in order of ordering, and hence so-called speculative orders are liable to be placed with a view to securing products, which can cause partially concentrated supply of products to some of the dealers. Depending on the product production capacity, there is a fear of increased delivery times of products to be supplied to the other dealers. In particular, when the products are automotive vehicles of a new model to be put on the market, orders therefor start to be accepted before the start of the sale thereof in order to enable the production of the new model to be boosted to cope with initial orders. On the other hand, dealers intend to secure as many vehicles as possible expecting orders from their customers since they are vehicles of a new-model. As a result, a large number of orders are apt to concentrate on the first day of receiving orders.

Under such circumstances, when the vehicles are dispatched to dealers in order of ordering, ones including many for speculative orders are dispatched at early times to dealers who placed their orders earlier, whereas the dispatching to the other dealers who placed their orders later is largely delayed. This causes an uneven dispatch of vehicles to the dealers, which is far from actual sales conditions. As a result, after the vehicles are on the market, some of the dealers have a large stock of the vehicles whose buyers are not determined for a long time, whereas in other dealers, although buyers of vehicles have already been determined, delivery times thereof are very long. This makes it impossible for the dealers as a whole to increase actual sales and the number of registered vehicles.

The present invention has been made in order to solve the above problems, and an object thereof is to provide a product ordering system which is capable of properly limiting orders placed by dealers, without impairing dealers' willingness to sell, while preventing partially concentrated supply of products to some of the dealers, thereby making it possible to make uniform and shorten delivery times for the dealers as a whole.

DISCLOSURE OF THE INVENTION

To attain the above object, the present invention provides a product ordering system for supplying products from a production source to a plurality of dealers in response to orders requesting supply of the products, which are placed by the plurality of dealers, according to an order in which the orders are placed, comprising estimated sales quantity-setting means for setting in advance an estimated sales quantity of the products to be sold during a predetermined time period, for each of the dealers, upper limit value-setting means for setting an upper limit value of an order quantity during the predetermined time period, for each of the dealers, according to the set estimated sales quantity and a predetermined coefficient, ordering means for placing the orders for the products from the plurality of dealers with the production source, cumulative order quantity-calculating means for calculating a cumulative order quantity during the predetermined time period, for each of the dealers, based on the orders placed by the ordering means, and order quantity-limiting means for limiting orders for the products in excess of the limit value by the dealer, by comparing the calculated cumulative order quantity and the upper limit value with each other.

According to this product ordering system, products are supplied from a production source to a plurality of dealers according to an order in which the orders are placed. Further, according to the product ordering system of the present invention, an estimated sales quantity of the products to be sold during a predetermined time period is set in advance, for each of the dealers, and an upper limit value of an order quantity is set according to the estimated sales quantity and a predetermined coefficient. Further, a cumulative order quantity placed by each dealer during the predetermined time period is calculated based on the orders placed by the dealer with the production source. Then, the order quantity-limiting means compares the cumulative order quantity and the upper limit value with each other, and limits orders for the products in excess of the upper limit value placed by the dealer.

As described above, in the product ordering system according to the present invention, orders placed by the dealers are not unconditionally accepted, but orders for the products in excess of the upper limit value are subject to limitation. This makes it possible to prevent partially concentrated supply of products to some of the dealers, thereby making it possible to make uniform and shorten delivery times of products, especially those in a great demand, such as new products and popular products, for the dealers as a whole. Further, the upper limit value is set using the estimated sales quantity set by each dealer, as a parameter, which prevents inhibition of willingness of the dealer to sell the products, and further, since the predetermined coefficient is used as a parameter, it is possible to properly limit orders placed by the dealers, while reflecting sales performance thereon. Further, since the upper limit value set as described above is compared with a cumulative order quantity placed by the dealer, it is possible to properly and flexibly limit orders placed by the dealer, while reflecting actual sales conditions of the dealer, thereon.

Preferably, in the product ordering system as claimed in claim 1, the upper limit value-setting means sets the upper limit value as an upper limit value for a second predetermined time period within the predetermined time period, the second predetermined time period being shorter than the predetermined time period, and the cumulative order quantity-calculating means calculates a cumulative order quantity during the second predetermined time period, the order quantity-limiting means limiting orders for the products in excess of the limit value during the second predetermined time period.

According to this construction, the setting of the upper limit value and limitation of orders are carried out with reference to a second predetermined time period shorter than the predetermined time period for which the estimated sales quantity is set. Therefore, even when an actual sales quantity exceeds the estimated sales quantity, or inversely even when the estimated sales quantity exceed an actual sales quantity, it is possible to supply products in a manner suited to actual sales conditions, by flexibly coping with either of the above cases.

Preferably, the product ordering system as claimed in claim 1 further comprises product information-storing means for storing information concerning types of products, and the predetermined coefficient is set for each of the stored types of products.

The popularity of products and demand therefor are varied depending on types thereof, and orders from the dealers are liable to concentrate on popular products. According to the present invention, the predetermined coefficient for setting the upper limit value is set for each type of products, and therefore, e.g. by setting the predetermined coefficient to smaller values for products for which orders from the dealers concentrate, such as popular products and new models, to thereby severely limit orders for the same, it is possible to finely and appropriately limit orders for products depending on the types thereof.

Preferably, the product ordering system as claimed in claim 1 further comprises suppliable quantity-setting means for setting a suppliable quantity of the products to be supplied during a unit time period, according to a product production capacity of the production source, and the predetermined coefficient is set to a larger value as the set suppliable quantity is larger.

The suppliable quantity of products to be supplied to the dealers is different depending on the product production capacity of the production source, and as the product production capacity is larger, the degree to which the orders from the dealers can be complied with becomes higher. Therefore, according to the present invention, as the suppliable quantity of products dependent on the product production capacity is larger, the predetermined coefficient is set to a larger value, for more relaxed limitation on orders by the upper limit value, whereby the limitation of orders can be appropriately carried out according to the product production capacity of the production source.

Preferably, the product ordering system as claimed in claim 1 further comprises suppliable quantity-setting means for setting a suppliable quantity of the products to be supplied during a unit time period, according to a product production capacity of the production source, cumulative order limitation quantity-calculating means for calculating a cumulative order limitation quantity based on quantities of order limitations by which the orders have been limited by the order quantity-limiting means, and delivery time-calculating means for calculating a delivery time based on the suppliable quantity and the cumulative order limitation quantity, and the predetermined coefficient is set to a smaller value as the delivery time is longer.

The delivery time in this case is determined depending on the relative relationship between the suppliable quantity of products dependent on the product production capacity of the production source and the cumulative order limitation quantity of products by which the orders have been limited. The longer the delivery time, the more contending status between orders by the sales companies is indicated. Therefore, according to the present invention, the predetermined coefficient is set to a smaller value as the delivery time is longer, thereby setting severer limitation on orders by the upper limit value, whereby it is possible to properly prevent concentrated and unbalanced supply of products to some of the dealers.

Preferably, in the product ordering system as claimed in claim 1, the ordering means includes input means for inputting data concerning whether or not buyers of the products are determined, and the cumulative order quantity-calculating means calculates the cumulative order quantity by accumulating only quantities of orders whose buyers are not determined.

According to this construction, orders are placed in a state in which commissioned orders whose buyers are determined, and non-commissioned orders whose buyers are not determined are discriminated from each other. The cumulative order quantity to be compared with the upper limit value is calculated only on the non-commissioned orders, and the quantity of commissioned orders is excluded from the cumulative order quantity. More specifically, the commissioned orders whose buyers are already determined are excluded from orders to be limited, to preferentially supply products for the commissioned orders, whereas limitation is applied to non-commissioned or speculative orders. This makes it possible to properly supply products in order of priority determined depending on whether or not orders are commissioned.

Preferably, in the product ordering system as claimed in claim 1, the ordering means includes cancellation means for canceling orders, and the cumulative order quantity-calculating means calculates the cumulative order quantity by subtracting a cancellation quantity of the orders canceled by the cancellation means from the order quantity.

According to this construction, when cancellation of orders occurs, the cumulative order quantity is calculated as a value obtained by subtracting the cancellation quantity of the cancelled orders from the order quantity, and compared with the upper limit value. This makes it possible to properly limit orders, while flexibly coping with the cancellation of orders.

Preferably, in the product ordering system as claimed in claim 1, the upper limit value-setting means includes first storage means for storing the set upper limit value, and the order quantity-limiting means includes second storage means, updating means for updating the upper limit value by inputting the upper limit value stored in the first storage means to the second storage means every predetermined updating time period, and comparison means for comparing the upper limit value stored in the second storage means and the cumulative order quantity with each other.

According to this construction, the upper limit value set by the upper limit value-setting means is stored in the first storage means, updated in the second storage means of the order quantity-limiting means every predetermined updating time period, and compared with the cumulative order quantity. Thus, when the upper limit value is set by the upper limit value-setting means, the upper limit value is not immediately updated in the order quantity-limiting means, but updated every predetermined updating time period. Therefore, by properly setting the updating time period, it is possible to prevent the updating process for updating the upper limit value, and the input process for inputting the cumulative order quantity or the comparison process for comparing the cumulative order quantity with the upper limit value from simultaneous occurring with the order quantity-limiting means. As a result, even when a very large number of orders are placed by the sales companies, the input process and the comparison process by the order quantity-limiting means can be smoothly carried out without being adversely affected by the updating process for updating the upper limit value.

The above and other objects, features, and advantages of the invention will become more apparent from the following detailed description taken in conjunction with the accompanying drawings.

BEST MODE FOR CARRYING OUT THE INVENTION

Figure 1:
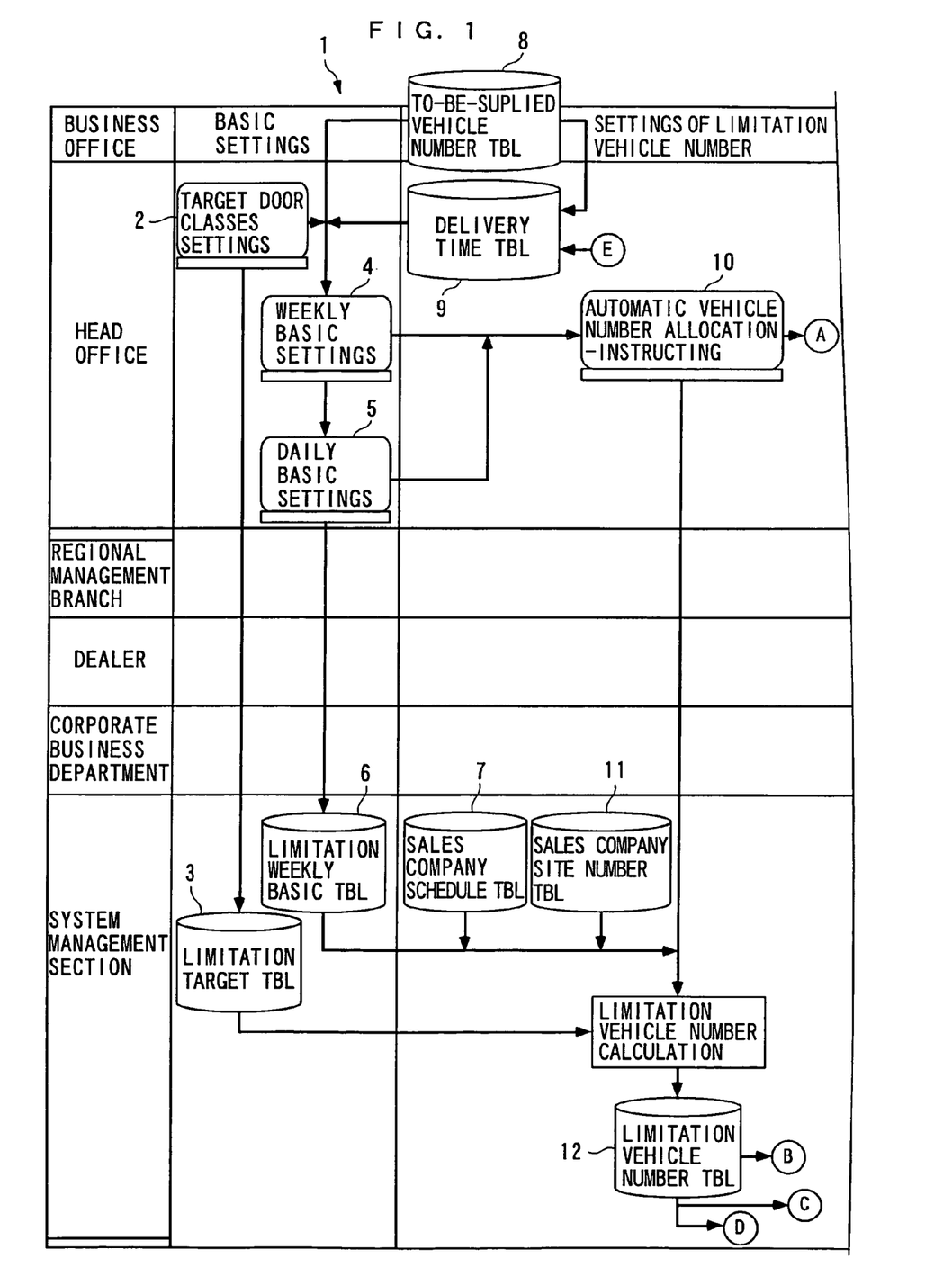
FIG. 1 is a block diagram showing the arrangement of a product ordering system to which is applied the present invention.
Figure 2:
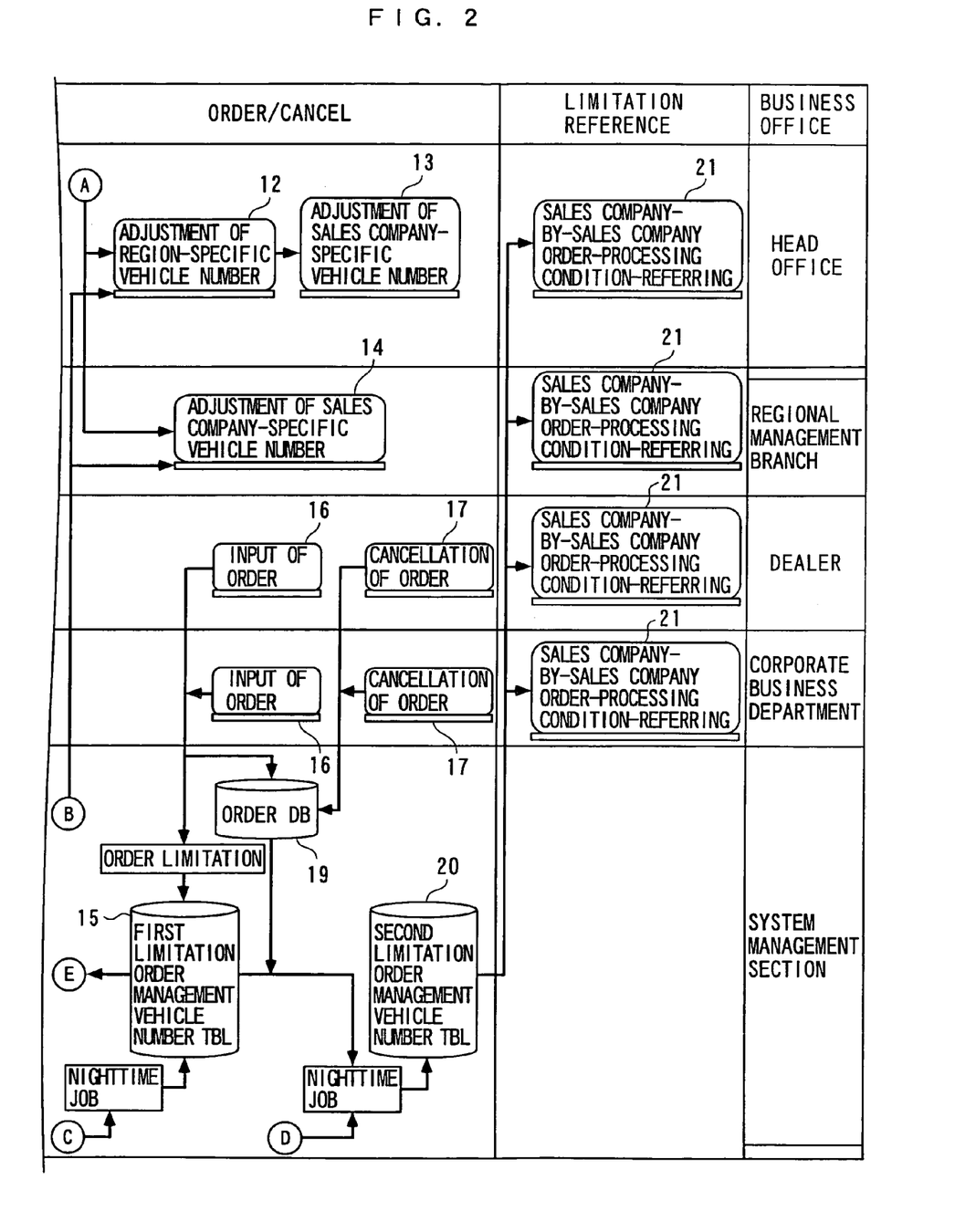
FIG. 2 is a block diagram showing the arrangement of the rest of the FIG. 1 product ordering system.

The invention will now be described in detail with reference to the drawings showing a preferred embodiment thereof. Referring first to FIG. 1, there is shown the whole arrangement of a product ordering system for ordering automotive vehicles, to which is applied the present invention. In the product ordering system (hereinafter simply referred to as the "system") 1, business offices are divided into a large number of dealers for selling automotive vehicles to general users, a corporate business department for selling automotive vehicles to major users (rental car companies, driving schools, and so forth) (hereinafter, both the dealers and the corporate business department are generically referred to as "sales companies" as deemed appropriate), regional management branches each for managing a plurality of dealers under jurisdiction thereof, a head office as a production source for managing the regional management branches, the dealers, and the corporate business department, and a system management section for managing the whole system. The business offices are connected on-line.

Figure 3:
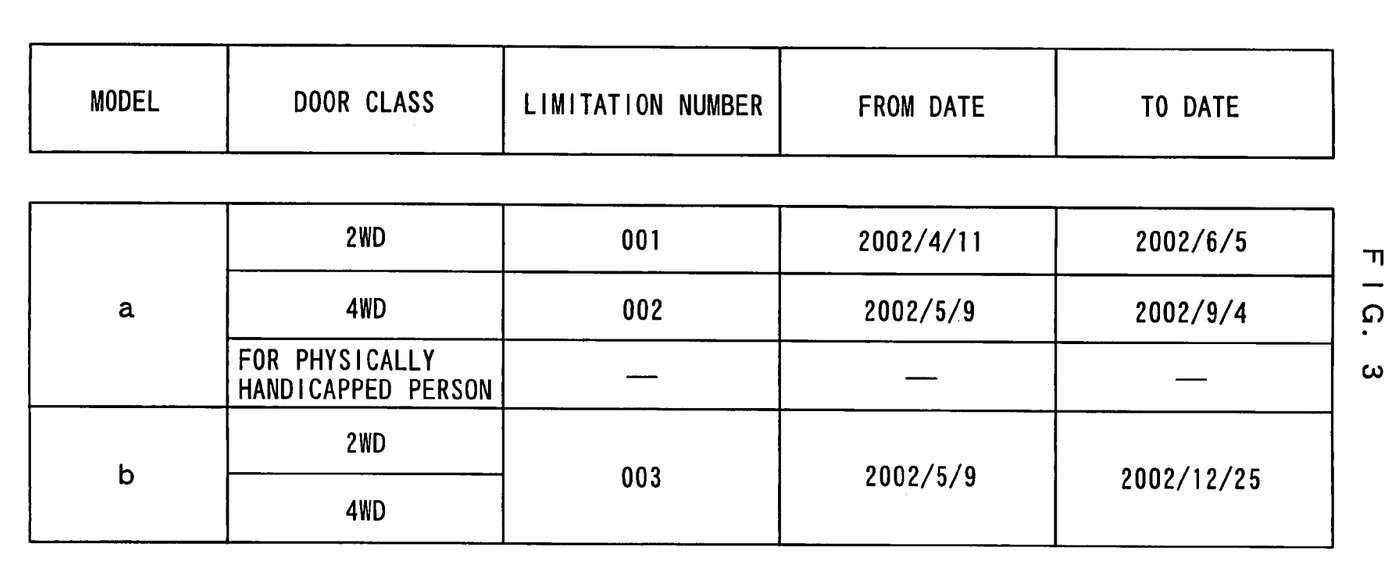
FIG. 3 is a diagram showing an example of a limitation target table.

In the present system 1, a target door class-setting section 2 of the head office performs setting of target door classes as a basic setting for limitation for limiting orders for products (hereinafter simply referred to as "orders") placed by the sales companies. The results of the setting operation are stored in a limitation target table (TBL) 3 of the system management section. FIG. 3 shows an example of the limitation target table of which setting items includes models, door classes, limitation numbers, and time periods (FROM DATE TO DATE) during which orders placed by the sales companies are received. In this case, as targets of limitation, there are selected all models for which orders placed by the sales companies are expected to contend, particularly such as new models and popular models.

The term "door class" is used to represent a type of products on which production constraints are reflected. By classifying vehicles into desired categories, such as a two-door type and a four-door type, in addition to the illustrated classification of 2WD and 4WD, it is possible to set a plurality of door classes for the same model. For the set door classes, respective limitation numbers for managing the limitation for limiting orders are obtained. By setting the targets of limitation not only according to models but also according to door classes as described above, it is possible to perform a fine and appropriate limitation. Further, door classes, such as the illustrated example of one for physically handicapped persons, which are so small in demand that there is no possibility of orders placed by the sales companies contending with each other, are excluded from the targets of the limitation, and no limitation numbers are obtained therefor.

Figure 4:
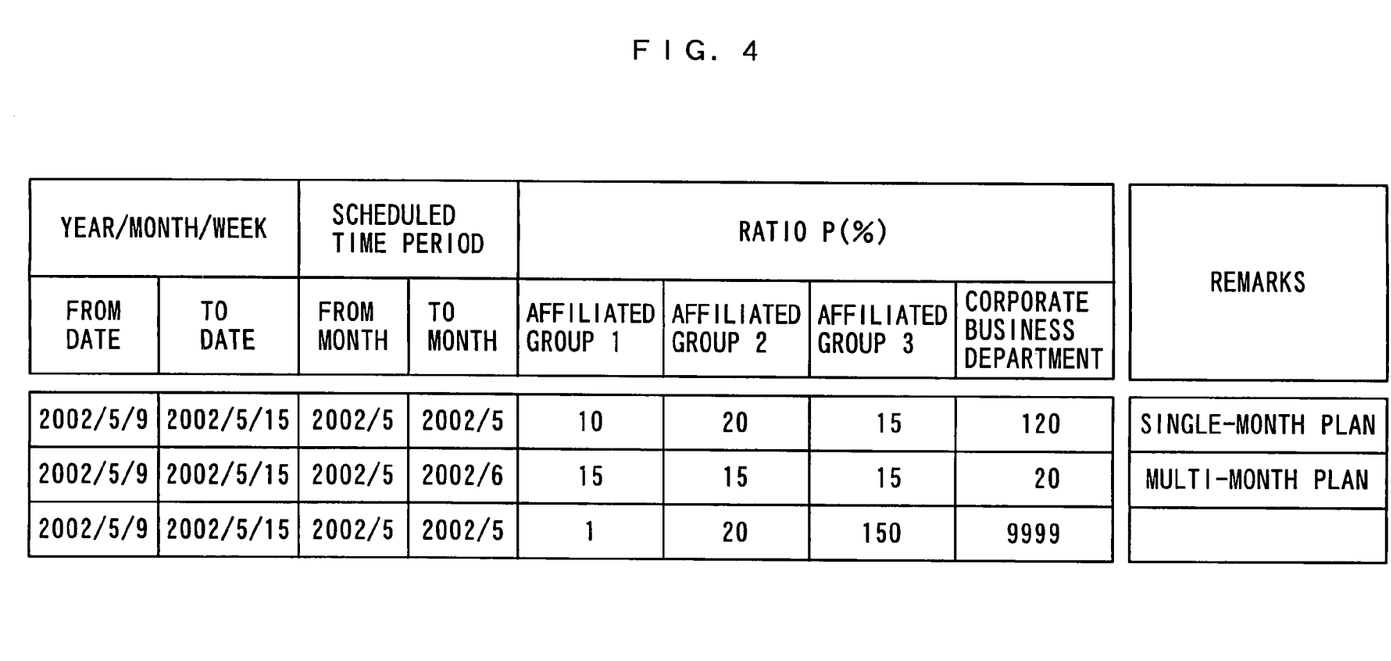
FIG. 4 is a block diagram showing three examples in a weekly basic table for limitation.

In the head office, a weekly basic setting section 4 makes weekly basic settings for limitation based on the above setting of target door classes, and a daily basic setting section 5 makes daily basic settings as required. The results of the setting operation are stored in a weekly basic table 6 of the system management section. FIG. 4 shows three examples in the weekly basic table. In a weekly calendar representing a particular week (FROM DATE TO DATE) as shown in FIG. 4, a scheduled time period (FROM MONTH TO MONTH) and ratios P (predetermined coefficient) are set.

The weekly calendar as a basis is formed by nighttime batch processing, on a limitation number-by-limitation number basis, by dividing time into periods of e.g. from Thursday to Wednesday. The ratios P can be set with respect to a scheduled time period using either a single-month plan (first example) or a multi-month plan (second example). Further, it is possible to specify the ratios P within a range of 1 to 9999%, as shown in a third example. In the illustrated examples, the ratios P are set for affiliated groups 1 to 3 for sales (sales channels), on an affiliated group-by-affiliated group basis, and for the corporate business department, the ratio P is set separately from the affiliated groups. It should be noted that the ratio P can also be set not on an affiliated group-by-affiliated group basis but on a dealer-by-dealer basis.

The ratio P represents a ratio of an upper limit value of the number of vehicles for which a sales company can place orders in a particular week, to an estimated number of to-be-sold vehicles (estimated sales quantity) which the sales companies have set and registered in advance for the scheduled time period. For instance, in the first example, assuming that a dealer A belonging to the affiliated group 1 has registered 100 vehicles as the estimated number of to-be-sold vehicles for May, a ratio of 10% provided for the affiliated group 1 is applied thereto, whereby an upper limit value of the quantity of orders which can be placed by the dealer A in the particular week is limited to 100 vehicles×10%=10 vehicles. It should be noted that the above estimated number of to-be-sold vehicles, set and registered to the scheduled time period, is stored in a sales company schedule table 7 on a sales company-by-sales company basis.

Figure 5:
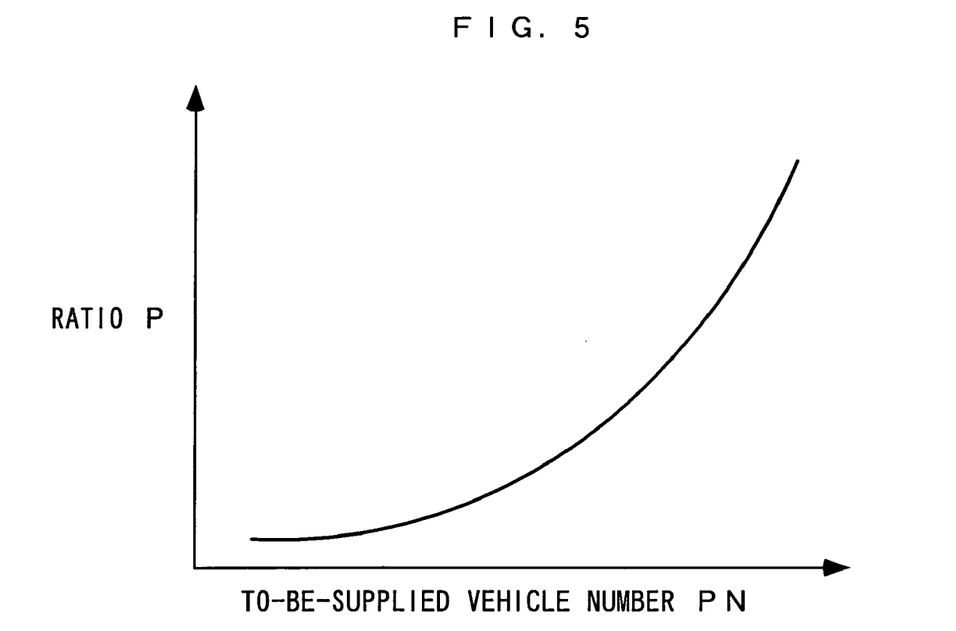
FIG. 5 is a diagram showing an example of a ratio set depending on the number of to-be-supplied vehicles.

Further, the above ratios P are set on a limitation number-by-limitation number basis depending on the number PN of to-be-supplied vehicles (suppliable quantity) stored in a to-be-supplied vehicle number table 8, and delivery times DL stored in a delivery time table 9. The number PN of to-be-supplied vehicles is set according to the product production capacity of the production source, and represents the number of vehicles suppliable during a unit time period. FIG. 5 shows an example of the ratio P set depending on the number PN of to-be-supplied vehicles. The ratio P is set to a larger value as the number PN of to-be-supplied vehicles is larger. By setting the ratio P as described above, the limitation is relaxed as the product production capacity is larger, so that the limitation can be properly effected depending on the product production capacity.

Figure 6:
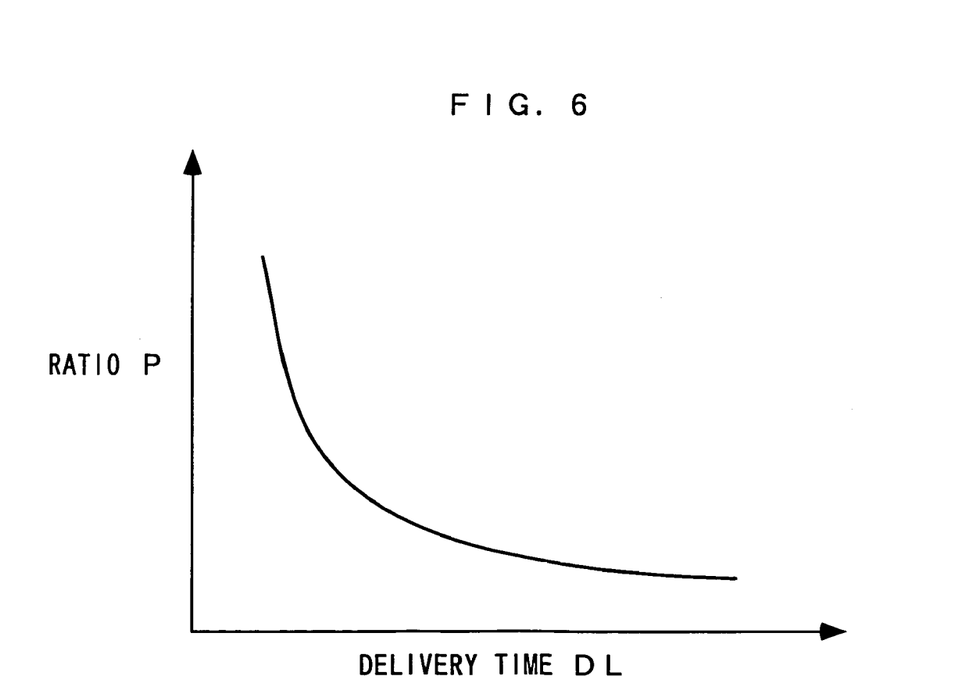
FIG. 6 is a diagram showing an example of the ratio set depending on a delivery time.

The delivery time DL is calculated based on the above number PN of to-be-supplied vehicles, and a cumulative number of vehicles by which orders have been limited as the results of the limitation, referred to hereinafter. As the delivery time DL is longer, it means that the more serious contention exists between the orders placed by the sales companies. FIG. 6 shows an example of the ratio P set depending on the delivery time DL, in which the ratio P is set to a smaller value as the delivery time DL is longer. If the ratio P is set as above, as the delivery time DL becomes longer, in other words, as the contention between orders placed by the sales companies is more serious, the limitation becomes severer, which makes it possible to properly prevent partially concentrated and unbalanced supply of products to some of the dealers.

Figure 7:
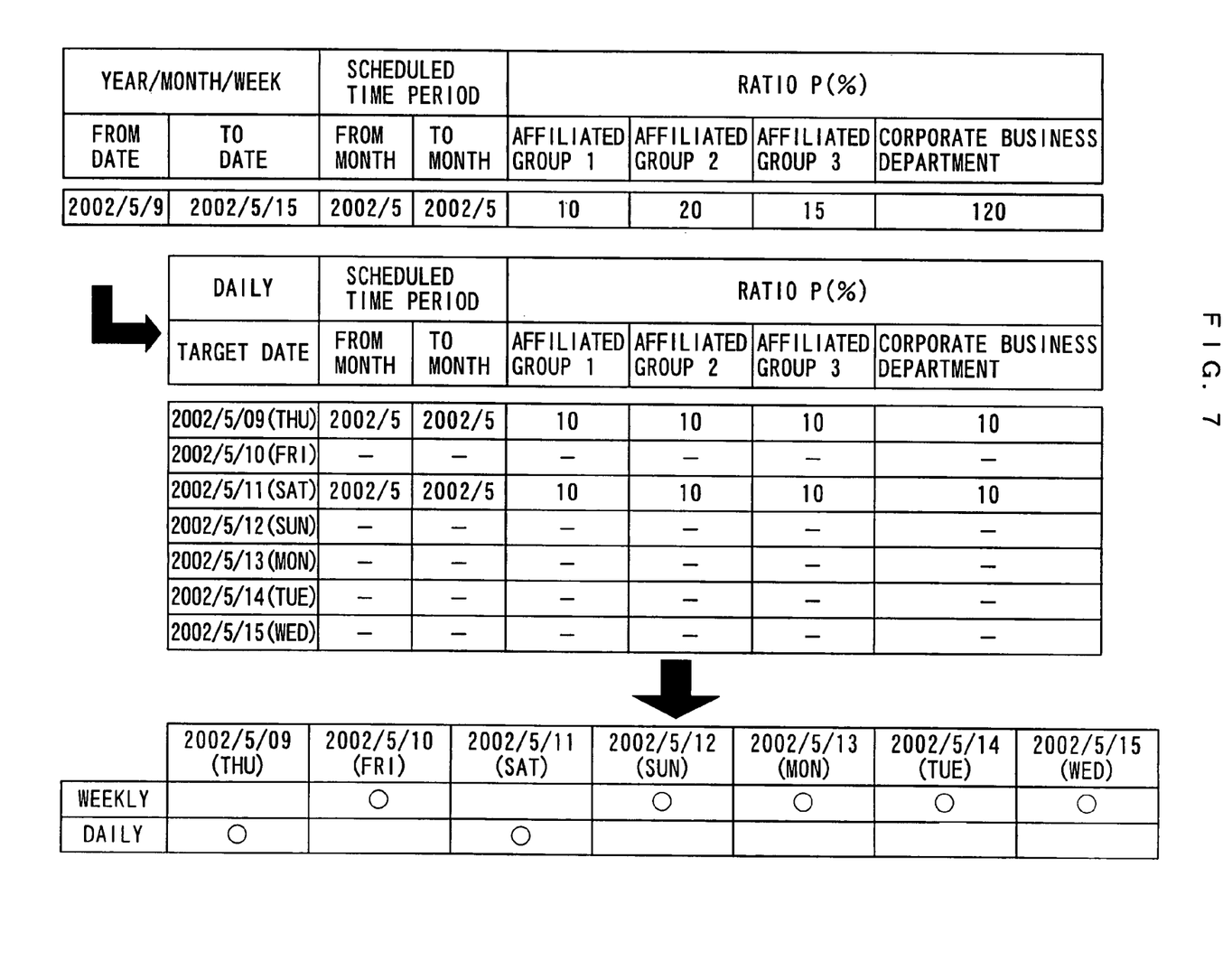
FIG. 7 is a diagram showing an example of a basic table using weekly basic settings for limitation in combination with daily basic settings.

FIG. 7 shows an example of a basic table using the weekly basic settings for limitation in combination with the daily basic settings. In this basic table, the same weekly basic settings as those in the FIG. 4 first example are made, and the daily basic settings are applied to particular two days (MAY 9 (Thu) and 11 (Sat) in one week. According to this example, a daily ratio of 10% is applied e.g. to dealers belonging to the affiliated group 2 for May 9 and May 11, while a weekly ratio of 20% is applied to the sum of the numbers of vehicles for which orders are to be placed during the other 5 days of the week. According to the above settings, by applying daily settings to particular days, such as release dates for new models, on which orders for the new models are expected to concentrate, it is possible to briefly relax the limitation to thereby flexibly supply products to the dealers. Although in the example illustrated in FIG. 7, the daily ratios P are set to be equal to or smaller than weekly ratios P, the daily ratios P can be set to be larger than the weekly ratios P, since the daily basic settings are used in combination with the weekly basic settings with a view to the above purpose.

Further, limitation vehicle numbers LN are automatically calculated by a computing section, not shown, within a limitation table 15, in response to instructions from an automatic vehicle number allocation-instructing section 10. In the above calculation, the limitation vehicle numbers LN, as upper limit values (upper limit values of the quantity of orders which can be accepted by the production source) of the number of vehicles orders for which are to be received during a target week (and target dates) set in the weekly and daily basic settings, are calculated for each of the sales companies and at the same time for each of the target door classes. More specifically, the limitation vehicle numbers LN are automatically calculated based on the target door classes, the ratios P, the estimated numbers of vehicles to be sold during a scheduled time period, all of which are set as above, as well as data concerning the sales companies, stored in a sales company site number table 11. The calculated limitation vehicle numbers LN are stored in a limitation vehicle number table 12.

Further, the limitation vehicle numbers LN stored in the limitation vehicle number table 12 are sent to first and second limitation order management vehicle number tables 15 and 20, by nighttime batch processing (JOB) every predetermined updating time period, e.g. on Wednesday, which is the last day of a week, for update. As described hereinafter, in the first limitation order management vehicle number table 15, order data are sequentially input from the sales companies through on-line operations during the daytime, and counting processes and limitation processes are carried out thereon. Therefore, by providing the limitation vehicle number table 12 and the first limitation order management vehicle number table 15 separately from each other, and updating the limitation vehicle numbers LN by sending the same from the former 12 to the latter 15 in the above-mentioned timing, it is possible to prevent the process for updating the limitation vehicle numbers LN from being carried out simultaneously with any of the processes for inputting order data, counting, and limitation, in the first limitation order management vehicle number table 15. As a result, even when a large amount of order data is sent from the sales companies, the processes in the first limitation order management vehicle number table 15 can be smoothly carried out without being adversely affected by the updating process for updating the limitation vehicle numbers LN.

Figure 8A:
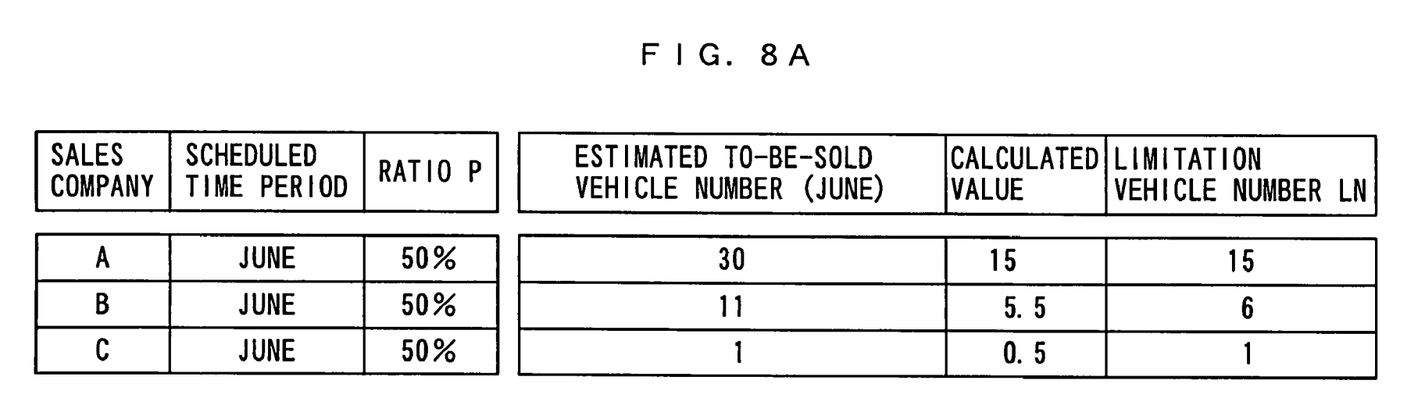
FIG. 8 is a diagram showing examples of limitation vehicle number tables formed based on (a) a single-month plan and (b) a multi-month plan.

FIG. 8 provides examples of the above limitation vehicle number table. FIG. 8(a) shows an example of the weekly settings in which a single-month plan is used for the scheduled time period with respect to which the ratios P are set. In this example, the ratio P is set to 50% with respect to a scheduled time period (June) for all of sales companies A to C. On the other hand, since the estimated number of vehicles to be sold by the sales company A during the particular scheduled time period is 30 vehicles, the limitation vehicle number LN for the sales company A during a particular week is calculated to 30 vehicles×50%=15 vehicles. Similarly, in the following, since the estimated numbers of vehicles to be sold by the sales companies B and C during the particular week are 11 vehicles and 1 vehicle, respectively, the limitation vehicle numbers LN for the sales companies B and C are calculated, respectively, to 11 vehicles×50%=5.5 vehicles, and 1 vehicle×50%=0.5 vehicles. By rounding up the number(s) after decimal point, 6 vehicles and 1 vehicle are obtained as the limitation vehicle numbers LN for the sales companies B and C.

Figure 8B:
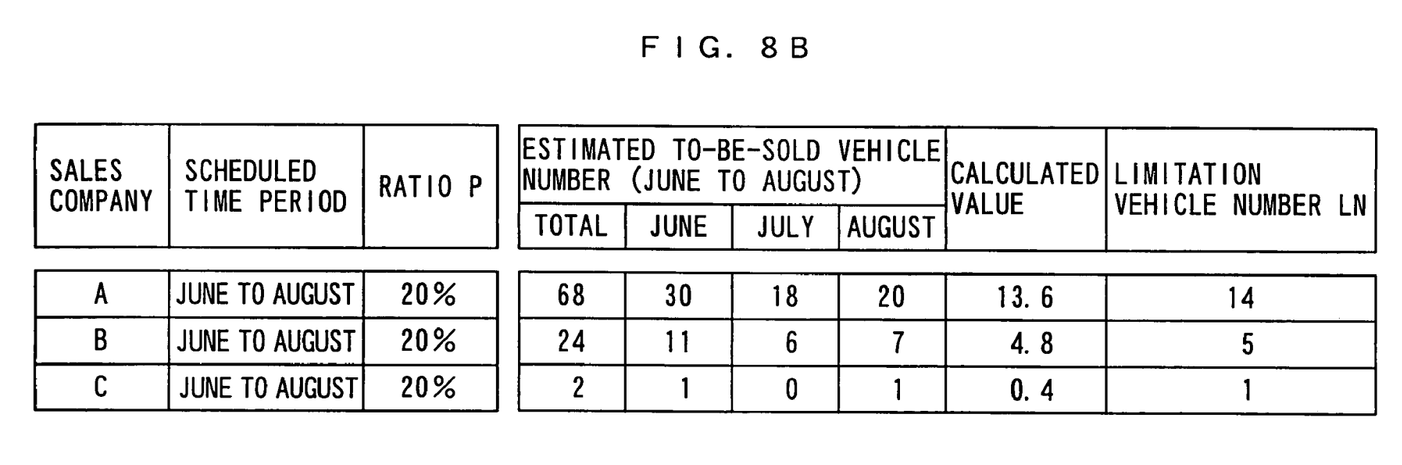

Further, FIG. 8(b) shows an example of the weekly settings in which a multi-month plan is used for the scheduled time period with respect to which the ratios P are set. In this case, respective totals of estimated numbers of vehicles to be sold during a scheduled time period (June to August) by the sales companies A to C are multiplied by the ratio P (=20%) set with respect to the scheduled time period for the sales companies A to C, whereby the respective limitation vehicle numbers LN for the sales companies A to C during a particular week are automatically calculated. Although not shown, when the limitation is set by daily settings, the limitation vehicle numbers LN are automatically calculated by using the ratios P of the daily settings, in the same manner as described above.

Figure 9:
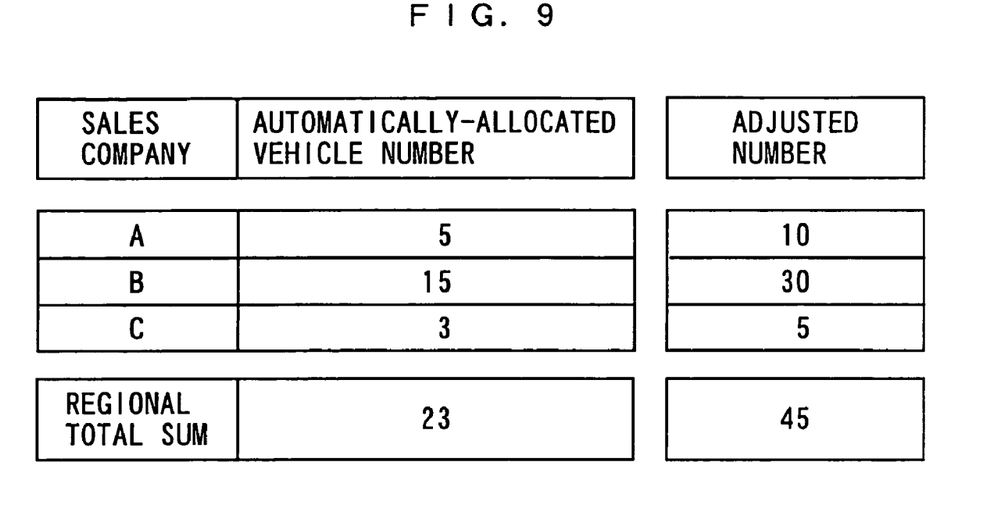
FIG. 9 is a diagram showing an example of adjustment of limitation vehicle numbers by a head office.

It is possible to adjust the limitation vehicle numbers LN automatically calculated as described above (hereinafter, in the present section, the limitation vehicle number LN will be referred to as "the automatically allocated vehicle number"). The adjustment of the vehicle numbers includes adjustments by a region-specific vehicle number-adjusting section 12 and a sales company-specific vehicle number-adjusting section 13 of the head office, and an adjustment by a sales company-specific vehicle number-adjusting section 14 of each regional management branch. The adjustments by the head office are carried out on all the sales companies, and as shown in FIG. 9, it is possible to freely adjust the automatically allocated vehicle numbers allocated to the respective sales companies without limiting the number of vehicles. Data of the adjusted number of vehicles are sent to the sales company-specific vehicle number-adjusting section 14 of a concerned regional management branch.

Figure 10:
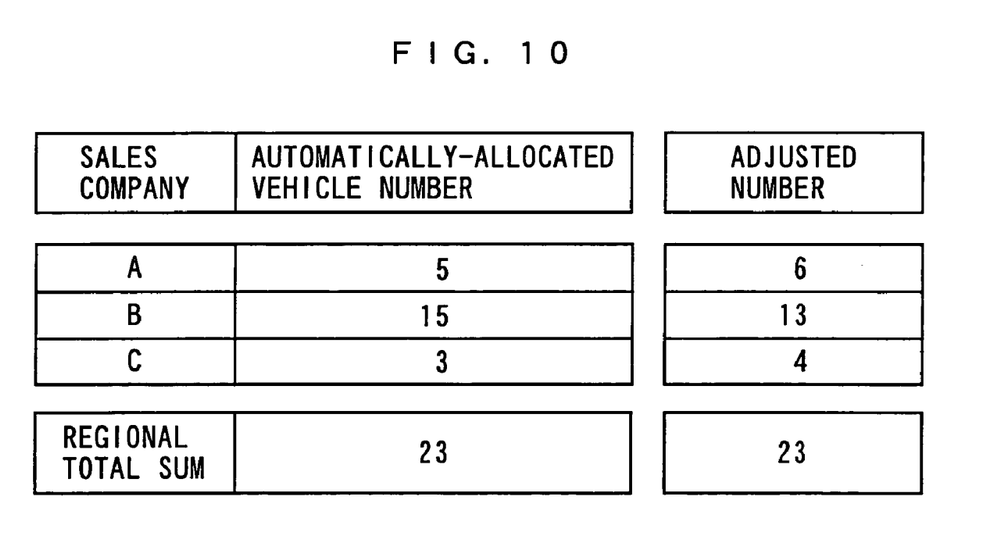
FIG. 10 is a diagram showing an example of adjustment of limitation vehicle numbers by a regional management branch.

In contrast, the adjustment by each regional management branch is carried out only on dealers under jurisdiction thereof. As shown in FIG. 10, this adjustment is carried out by increasing or decreasing the automatically allocated vehicle numbers (or the numbers of vehicles adjusted by the head office) between the dealers under jurisdiction of the regional management branch, but it is not allowed to perform the adjustment such that the total sum of adjusted numbers exceeds the total sum (23 vehicles in the illustrated example) of the automatically allocated vehicle numbers allocated to the dealers under jurisdiction of the regional management branch. When the automatically allocated vehicle numbers are adjusted as above, the adjusted numbers of vehicles are determined as the final limitation vehicle numbers LN (upper limit value), and data of the adjusted number of vehicles are sent to the limitation vehicle number table 12.

The placing and canceling of orders for products by the dealers and the corporate business department is carried out by their order-inputting sections 16 and order-canceling sections 17 through on-line operations during the daytime. It should be noted that when an order is placed or cancelled, information of whether or not the order is a commissioned one in which a buyer of the product is determined, is simultaneously input. After the order is input, data of the order is transmitted to the first limitation order management vehicle number table 15, where an order limitation process is executed by a computing section, not shown, of the table. The order limitation process is carried out so as to allow or limit the order based on the result of comparison between limitation vehicle numbers LN set as described above and the numbers of vehicles of the actual orders.

Figure 11:
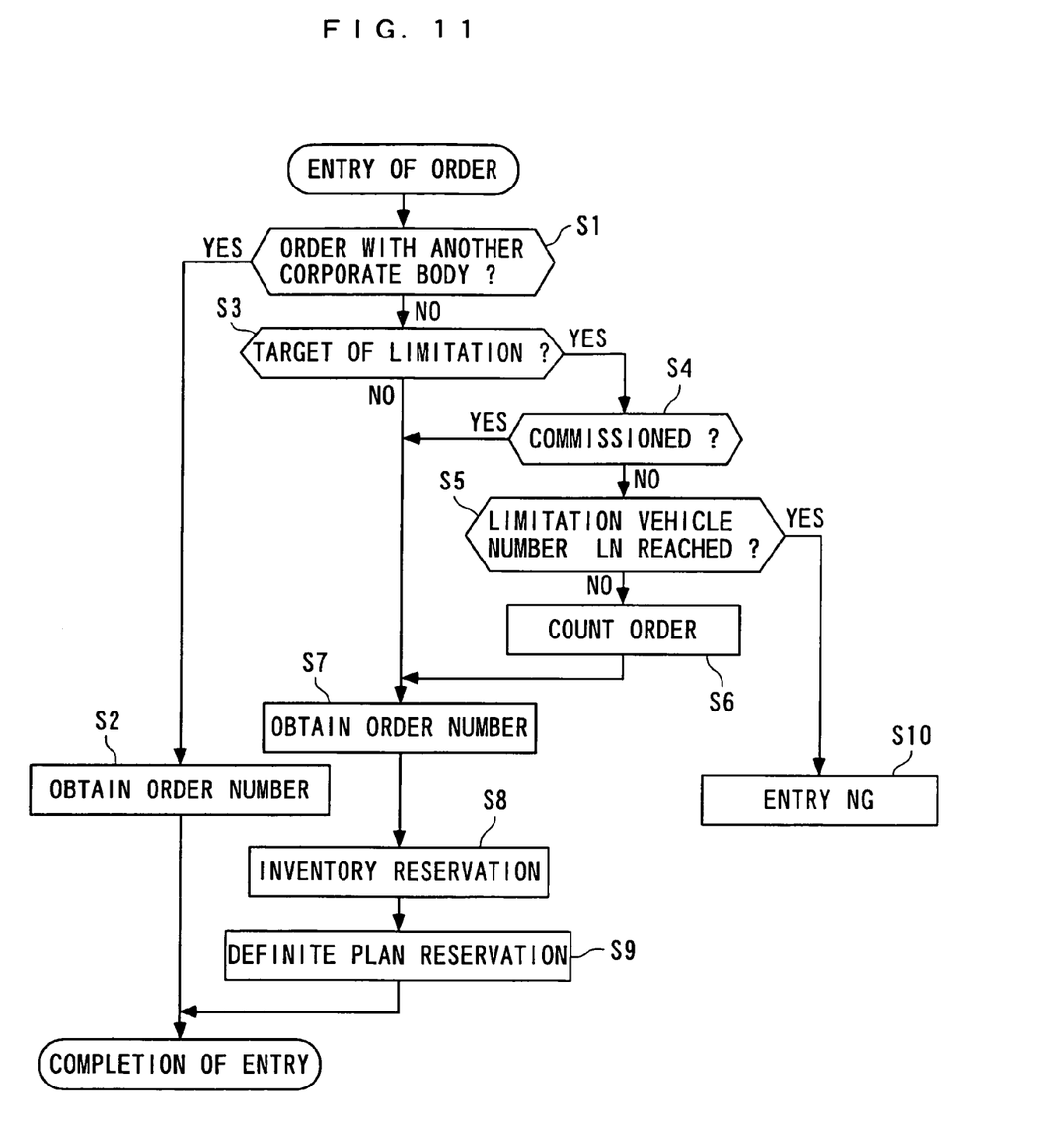
FIG. 11 is a flowchart showing an order limitation process.

In the following, the order limitation process will be described with reference to FIG. 11. In this process, first, in a step 1 (in FIG. 1, shown as "S1"; which rule applies similarly in the following description), it is determined whether or not the order is placed not with the head office but with another corporate body (such as an order for supply of a vehicle from another regional management branch). If the answer to this question is affirmative (YES), the order has no relation to supply of products from the head office, so that only the obtaining of an order number is carried out in a step 2, followed by terminating the present program.

If the answer to the question of the step 1 is affirmative (YES), i.e. when the order is placed with the head office, it is determined in a step 3 whether or not the ordered product is a target of limitation. If the answer to this question is affirmative (YES), i.e. if the ordered product is a target of limitation for which a limitation number has been obtained, it is determined in a step 4 whether or not the order is a commissioned one with a buyer. If the answer to this question is negative (NO), i.e. when the order is a non-commissioned one (i.e. speculative order), that is, when no buyer of the ordered product is determined, it is determined in a step 5 whether or not an order count CN (cumulative order quantity accepted by the production source) of ordered products associated with the particular limitation number, which has been counted heretofore, has already reached a corresponding limitation vehicle number LN.

If the answer to this question is negative (NO), i.e. when the order count CN has not reached the limitation vehicle number LN (CN<LN), it is judged that the order should be allowed, and a value of 1 is added to the order count CN, for counting in a step 6. Then, an order number is obtained for the order in a step 7. After the order number is obtained, if the production of the ordered product has been completed, in a step 8, inventory reservation is carried out for the order number, whereas when a production plan of the product is definite, in a step 9, definite plan reservation is carried out for the order number, followed by terminating the present program.

On the other hand, if the answer to the question of the step 5 is affirmative (YES), i.e. when the order count CN has already reached the limitation vehicle number LN (CN=LN), the order is rejected in a step 10 (ENTRY NG). By carrying out the above processes, orders in excess of the limitation vehicle number LN are limited on a limitation number-by-limitation number basis, i.e. on a target door class-by-target door class basis. It should be noted that the number of orders rejected for the limitation as above are totalized, and transmitted to the delivery time table 9 as a cumulative limitation order number.

On the other hand, if the answer to the question of the step 4 is affirmative (YES), i.e. when the order is a commissioned one with a buyer of the ordered product being determined, the above step 5 and step 6 are skipped over to the above step 7 et. seq., to carry out only the obtaining of an order number, and reservation therefor. More specifically, when the order is a commissioned one, the order is left out of the limitation as well as from the order count CN. By carrying out the above processes, products are preferentially supplied for commissioned orders whose buyers are already determined, while products are supplied later for non-commissioned or speculative orders. This makes it possible to properly supply products in order of priority determined depending on whether or not the orders are commissioned.

Order data input from the order-inputting section 16 of each sales company are transmitted to an order database (DB) 19. Further, when orders are cancelled by the order-canceling sections 17 of sales companies, cancellation data of the cancelled orders are also transmitted to the order database 19. The order data and the cancellation data are totalized into the number of ordered vehicles and the number of cancelled vehicles for the current business day, by nighttime batch processing after termination of on-line operations during the day, and transmitted to the second limitation order management vehicle number table 20.

Figure 12:
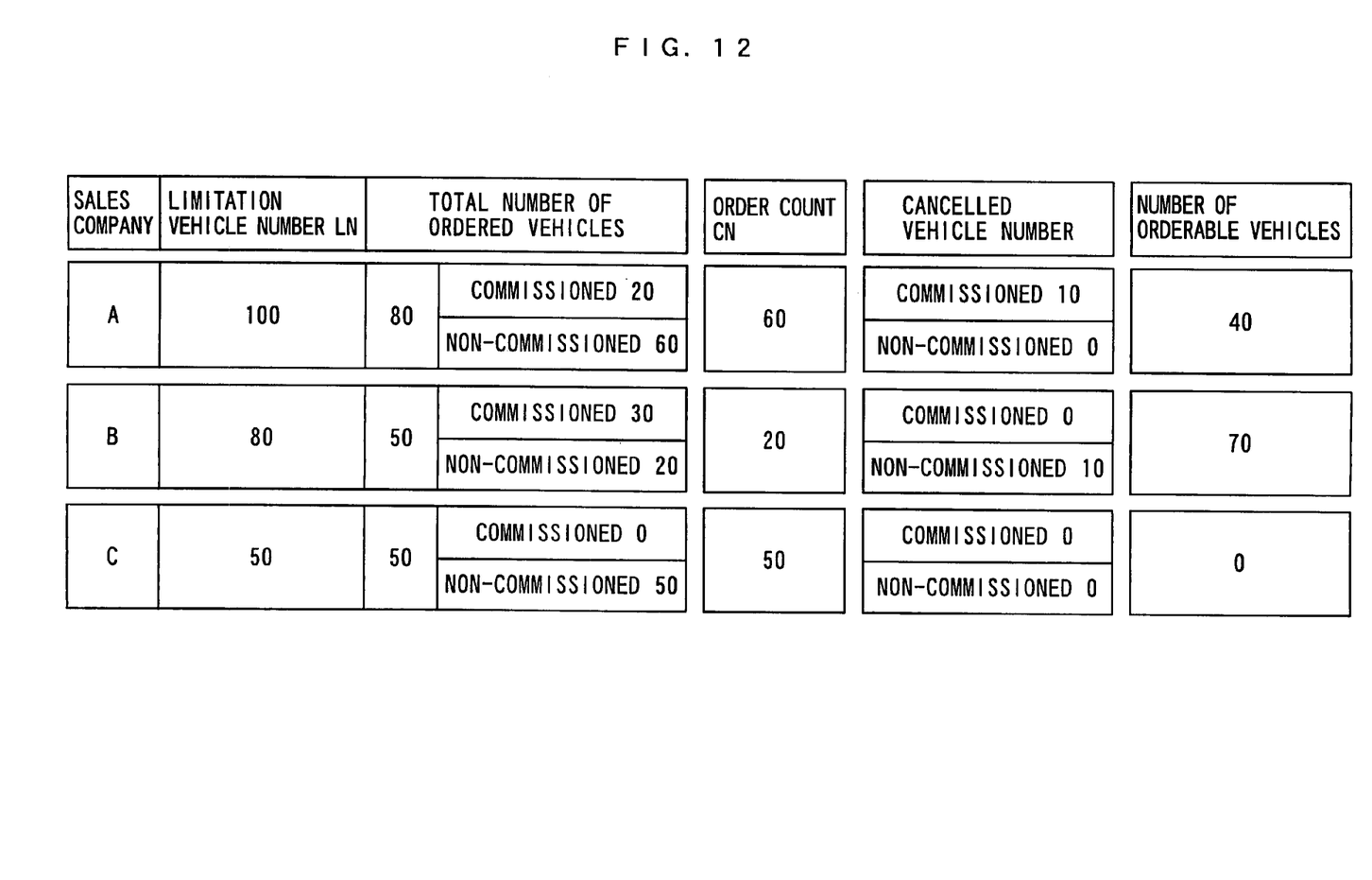
FIG. 12 is a diagram showing an example of an order-filling status table.

FIG. 12 shows an order-filling status table stored in the second limitation order management vehicle number table 20. This table shows, in list form, limitation vehicle numbers LN, ordered and cancelled states, numbers of orderable vehicles, and so forth, for a particular week, on a sales company-by-sales company basis, and on a target door class-by-target door class basis. For example, in the example of the sales company B, the limitation vehicle number LN is 80, and the total number of ordered vehicles up to the time point is 50 (commissioned: 30; and non-commissioned: 20). As described hereinbefore, since the vehicles of the commissioned orders are excluded from the order count CN (only the vehicles of the non-commissioned orders are counted), in this case, the order count CN becomes equal to the total number of ordered vehicles minus the number of vehicles of commissioned orders=50−30=20. Further, the number of vehicles of cancelled orders up to the time point is 10 (commissioned: 0, non-commissioned: 10), and the number of vehicles of the cancelled non-commissioned orders is reflected on the number of orderable vehicles. Therefore, the number of orderable vehicles becomes equal to the limitation vehicle number LN minus the order count CN plus the number of vehicles of the cancelled non-commissioned orders=80−20+10==70.

In contrast, in the example of the sales company A, only commissioned orders are cancelled, and the commissioned orders are originally excluded from the order count CN, and hence the number of vehicles of the cancelled commissioned orders is not reflected on the number of orderable vehicles. Therefore, the number of orderable vehicles in this case becomes equal to LN−CN=80−60=20. The order-filling status table having the above contents can be fetched from the second limitation order management vehicle number table 20 to a sales company-by-sales company processing condition-referring section 21 of each business office, for display. In each business office, by viewing the display, it is possible to easily know the number of orderable vehicles at the time point. In this case, the displayed contents can be changed depending on each business office. For example, the head office can display data concerning all the sales companies, the regional management branch can display data only of dealers under jurisdiction thereof, and the dealers and the corporate business department can display data only of the particular business office.

Figure 13:
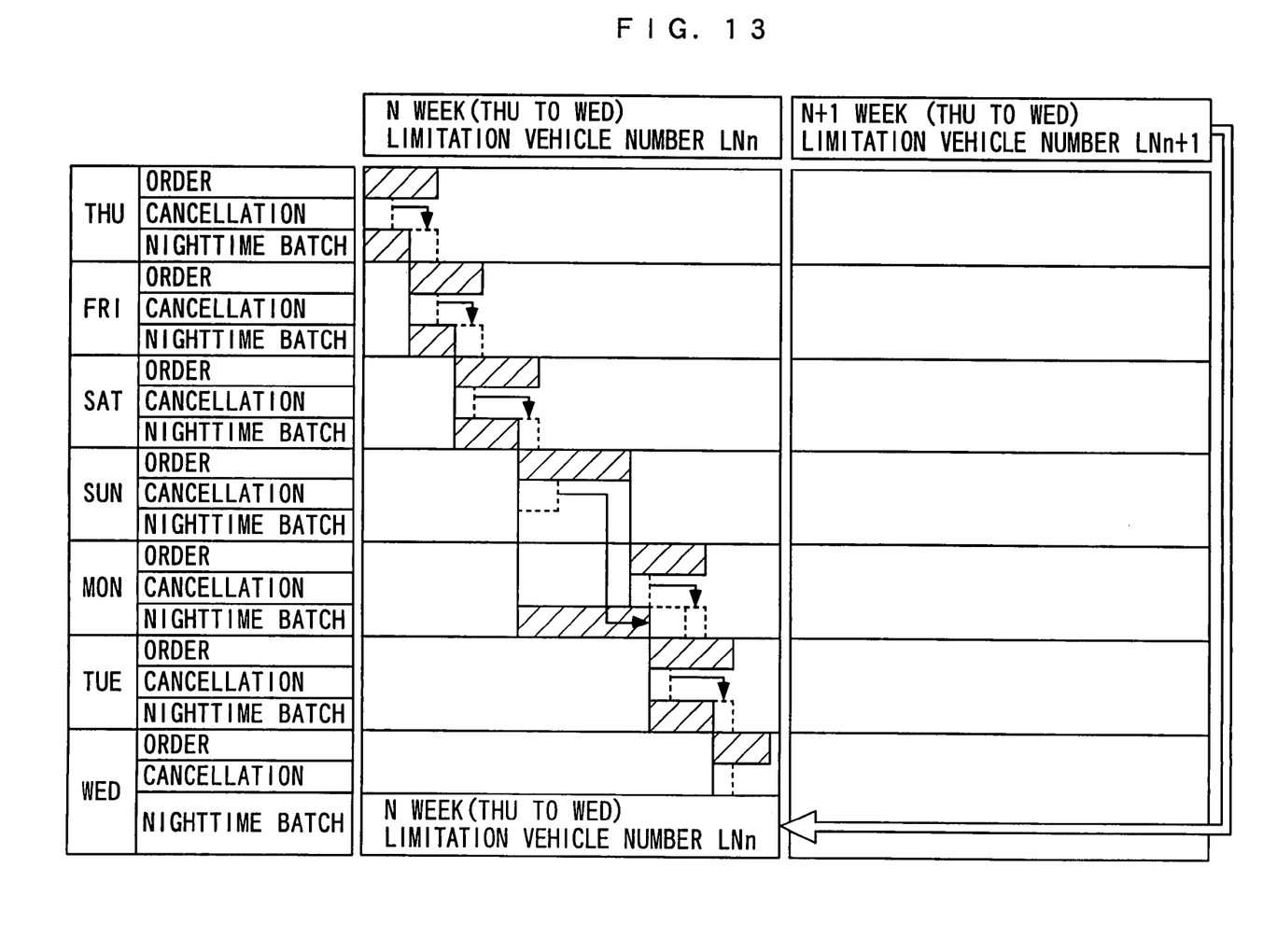
FIG. 13 a diagram showing a method of reflecting cancelled orders on the limitation vehicle number.

FIG. 13 shows a method of reflecting orders and cancellations on limitation vehicle numbers LN. As described above, order data and cancellation data from each sales company are input by daytime on-line operations, and sequentially transmitted to the order database 19. The order data and the cancellation data are totalized into the numbers of ordered vehicles and the numbers of cancelled vehicles for the current business day, by nighttime batch processing after termination of on-line operations during the day, and transmitted to the second limitation order management vehicle number table 20. Thus, it is possible to reflect orders cancelled on the preceding day on limitation vehicle numbers LN on the day next to the preceding day. It should be noted that in the illustrated example, Sunday is a day when nighttime batch processing is not carried out, and therefore, orders cancelled on Sunday are processed together with orders cancelled on Monday by nighttime batch processing on Monday, for reflection on limitation vehicle numbers LN on Tuesday. Further, orders cancelled on Wednesday, i.e. the last day of the week, are not reflected on limitation vehicle numbers LN next week.

Further, limitation vehicle numbers $LN_{n+1}$ to be used next week (N+1 week) are shifted as limitation vehicle numbers $LN_n$ used in the current week during execution of nighttime batch processing on Wednesday, in the second limitation order management vehicle number table 20, for update, and at the same time, data of limitation vehicle numbers LN of the latest two weeks are transmitted from the limitation vehicle number table 12 to the second limitation order management vehicle number table 20. Although in the above-described embodiment, the first and second limitation order management vehicle number tables 15 and 20 are described as tables separate from each other, the two tables can be formed by one table.

INDUSTRIAL APPLICABILITY

As described hereinbefore, the product ordering system according to the present invention is capable of properly limiting orders placed by dealers, without inhibiting the dealers' willingness to sell, while preventing partially concentrated supply of products to some of the dealers. This makes it possible to make uniform and shorten the delivery times for the dealers as a whole. Therefore, the product ordering system according to the present invention can be suitably used in placing orders for products in all industrial fields to say nothing of the field of automotive vehicles exemplified in the embodiment.

The invention claimed is:

1. A product ordering system for supplying products from a production source to a plurality of dealers in response to orders requesting supply of the products, which are placed by the plurality of dealers, according to an order in which the orders are placed, comprising:

estimated sales quantity-setting means for setting in advance an estimated sales quantity of the products to be sold during a predetermined time period, for each of the dealers;

upper limit value-setting means for setting an upper limit value of an order quantity during the predetermined time period, for each of the dealers, according to the set estimated sales quantity and a predetermined coefficient, wherein the predetermined coefficient is determined based on a type of a product and at least one selected from a group consisting of a suppliable quantity of the products and a delivery time of the product;

ordering means for placing the orders for the products from the plurality of dealers with the production source;

cumulative order quantity-calculating means for calculating a cumulative order quantity during the predetermined time period, for each of the dealers, based on the orders placed by said ordering means; and order quantity-limiting means for limiting orders for the products in excess of the limit value by the dealer, by comparing the calculated cumulative order quantity and the upper limit value with each other.

2. A product ordering system as claimed in claim 1, wherein said upper limit value-setting means sets the upper limit value as an upper limit value for a second predetermined Urns period within the predetermined Urns period, said second predetermined time period being shorter than the predetermined Urns period, and wherein said cumulative order quantity-calculating means calculates a cumulative order quantity during the second predetermined time period, and wherein said order quantity-limiting means limits orders for the products in excess of the limit value during the second predetermined time period.

3. A product ordering system as claimed in claim 1, further comprising product information-storing means for storing information concerning types of products, and wherein the predetermined coefficient is set for each of the stored types of products.

4. A product ordering system as claimed in claim 1, further comprising suppliable quantity-setting means for setting a suppliable quantity of the products to be supplied during a unit time period, according to a product production capacity of the production source, and wherein the predetermined coefficient is set to a larger value as the set suppliable quantity is larger.

5. A product ordering system as claimed in claim 1, further comprising:

suppliable quantity-setting means for setting a suppliable quantity of the products to be supplied during a unit time period, according to a product production capacity of the production source, cumulative order limitation quantity-calculating means for calculating a cumulative order limitation quantity based on quantities of order limitations by which the orders have been limited by said order quantity-limiting means, and delivery time-calculating means for calculating a delivery time based on the suppliable quantity and the cumulative order limitation quantity, and wherein the predetermined coefficient is set to a smaller value as the delivery time is longer.

6. A product ordering system as claimed in claim 1, wherein said ordering means includes input means for inputting data concerning whether or not buyers of the products are determined, and wherein said cumulative order quantity-calculating means calculates the cumulative order quantity by accumulating only quantities of orders whose buyers are not determined.

7. A product ordering system as claimed in claim 1, wherein said ordering means includes cancellation means for canceling orders, and wherein said cumulative order quantity-calculating means calculates the cumulative order quantity by subtracting a cancellation quantity of the orders canceled by said cancellation means from the order quantity.

8. A product ordering system as claimed in claim 1, wherein said upper limit value-setting means includes first storage means for storing the set upper limit value, and wherein said order quantity-limiting means includes:

second storage means, updating means for updating the upper limit value by inputting the upper limit value stored in said first storage means to said second storage means every predetermined updating time period, and comparison means for comparing the upper limit value stored in said second storage means and the cumulative order quantity with each other.

* * * * *